Dec. 16, 1947.  C. W. WALZ ET AL  2,432,956
BEET LOADER
Filed Aug. 26, 1942    3 Sheets-Sheet 1

INVENTORS
CLAUDE W. WALZ
CLARENCE T. RASMUSSEN
ROBERT D. GRIFF
BY
ATTORNEYS

Dec. 16, 1947.  C. W. WALZ ET AL  2,432,956
BEET LOADER
Filed Aug. 26, 1942  3 Sheets-Sheet 2

INVENTORS
CLAUDE W. WALZ
CLARENCE T. RASMUSSEN
ROBERT D. GRIFF
BY
ATTORNEYS

Dec. 16, 1947.  C. W. WALZ ET AL  2,432,956
BEET LOADER
Filed Aug. 26, 1942  3 Sheets-Sheet 3
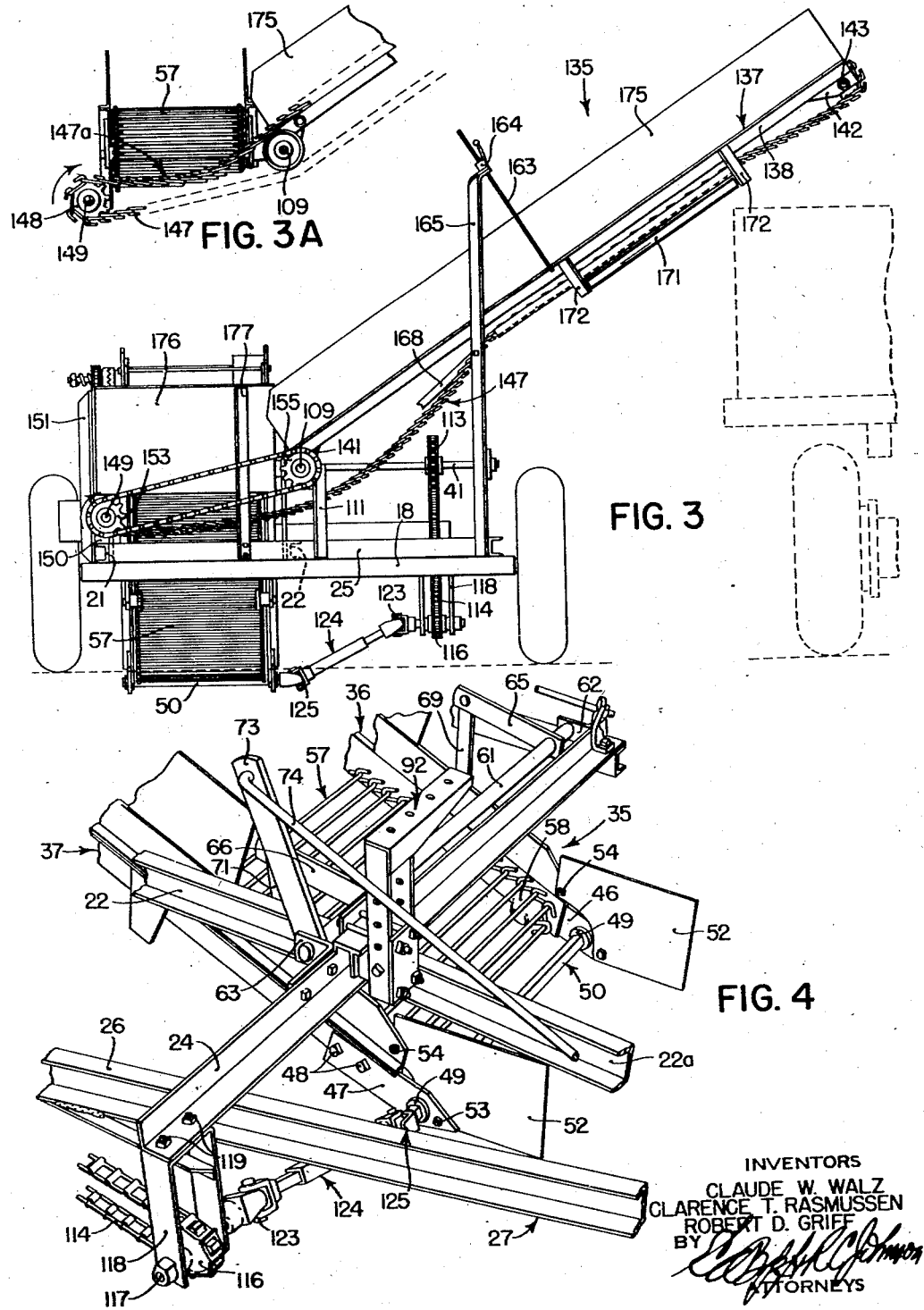

Patented Dec. 16, 1947

2,432,956

UNITED STATES PATENT OFFICE 2,432,956

BEET LOADER

Claude W. Walz, Avondale, Colo., and Clarence T. Rasmussen, Moline, and Robert D. Griff, Rock Island, Ill., assignors to Deere & Company, Moline, Ill., a corporation of Illinois Application August 26, 1942, Serial No. 456,459

17 Claims. (Cl. 55—17)

The present invention relates generally to loaders for agricultural root crops and the like, such as sugar beets or the like.

The object and general nature of the present invention is the provision of an improved loader for picking up beets from the ground, as from a pile or windrow, and elevating them into a wagon or truck drawn alongside the loader. Further, it is a particular feature of this invention to provide means for picking up beets from the ground and elevating them upwardly without bruising or injuring them. A further feature of this invention is the provision of a means and method for picking up beets and the like from the ground by a member that passes just underneath the ground surface and impels or kicks the beets or other crop upwardly and rearwardly with a cushion of soil between the pick-up member and the beets. An additional feature of this invention is the provision of improved conveyor and elevator means for handling the crop and particularly is it a feature of this invention to provide a transverse elevator supported by rotatable members at its upper and lower ends and driven by the lower member, whereby the upper flight or run of the elevator is relatively slack, thereby serving as a receptacle for receiving the beets or other crop.

These and other objects and advantages of the present invention will be apparent to those skilled in the art after a consideration of the following detailed description, taken in conjunction with the accompanying drawings.

In the drawings:

Figure 3 is a rear view of the machine shown in Figures 1 and 2;

Figure 3A is a fragmentary rear view showing the beet receiving portion of the wagon elevator;

Figure 4 is a fragmentary perspective of the front end of the conveyor and the ground engaging pick-up unit; and Figure 5 is an enlarged fragmentary view illustrating the manner in which the pick-up unit operates to kick or impel the beets rearwardly and upwardly through an interposed protecting cushion of soil.

Figure 1:
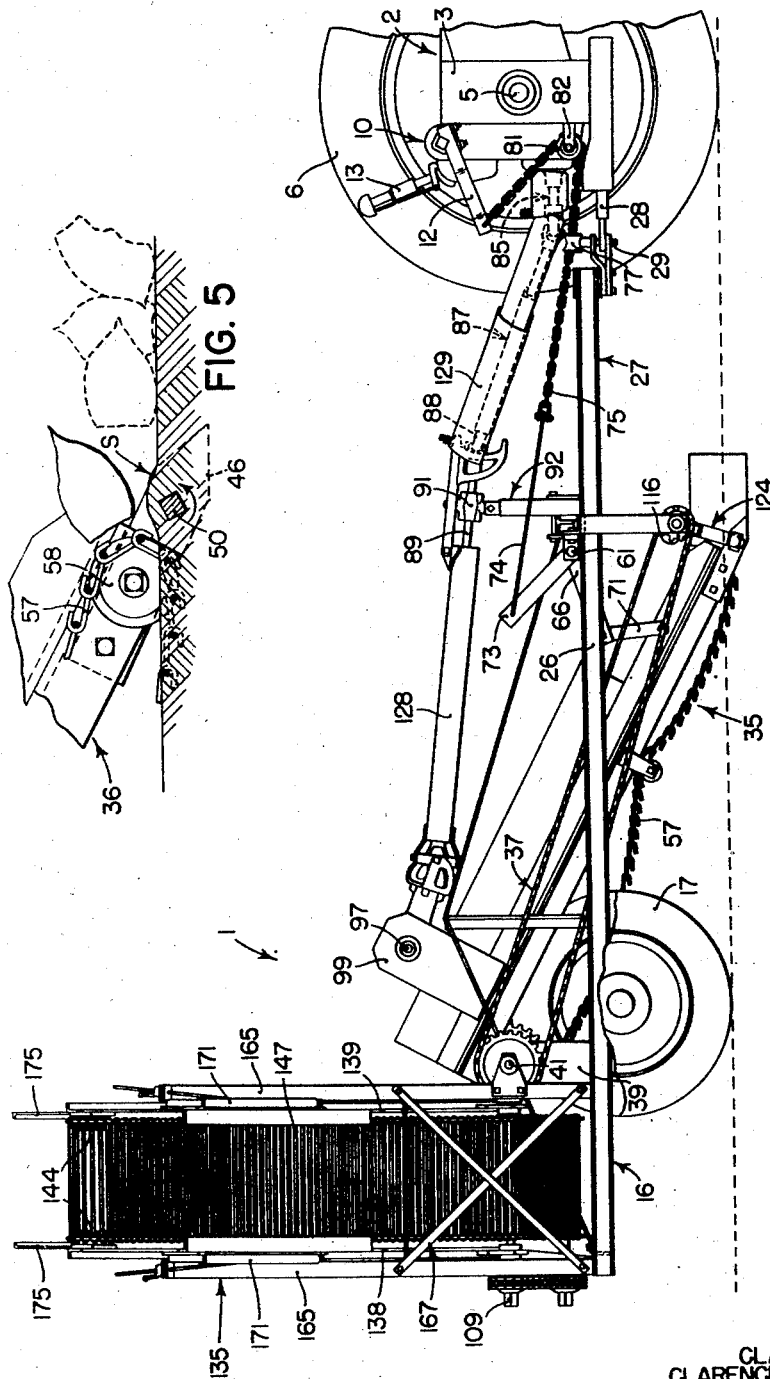
Figure 1 is a side view of a tractor-propelled loader constructed according to the principles of the present invention.
Figure 2:
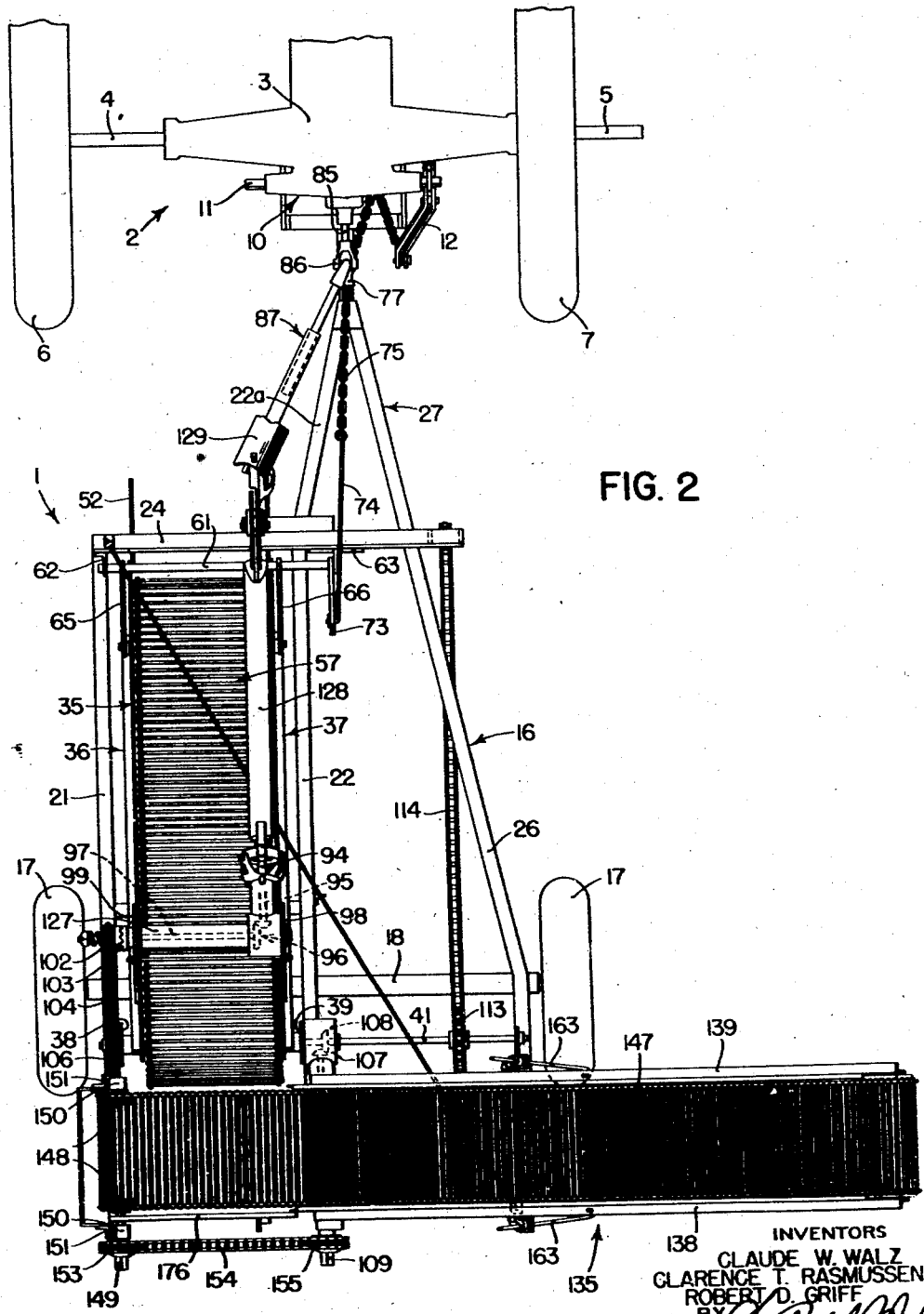
Figure 2 is a plan view of the machine shown in Figure 1.

Referring now to the drawings, more particularly Figures 1 and 2, the beet loader is indicated in its entirety by the reference numeral 1 and is adapted to be propelled by a tractor 2 of conventional construction, embodying a rear axle housing 3 in which axle shafts 4 and 5 are journaled and which receive rear traction wheels 6 and 7. The tractor 2 includes a source of power such as a motor, for driving the axle shafts 4 and 5 and also for actuating a power lift unit 10 which includes a rockshaft 11 on which an arm 12 is fixed. Additional reference to the power unit 10 will be made below. The power lift 10 is controlled by a valve operating handle 13 which may be adjusted to automatically control the lowered position of the arm 12.

The loader 1 includes a mobile supporting frame 16 carried on ground wheels 17 by means of an axle 18 or the like. The frame 16 includes a pair of longitudinally extending frame members 21 and 22 connected together at their front and rear ends by cross members 24 and 25, as best shown in Figures 1 and 3. Both cross members 24 and 25 extend laterally to the right and are connected with a third generally longitudinally extending frame member 26 which, cooperating with the forwardly and laterally bent portion 22a (Figure 2), forms a forward hitch section 27 that is connected to the drawbar 28 of the tractor by a coupling pin 29.

A conveyor and pick-up unit 35 is carried by the frame 16 between the longitudinal members 21 and 22, the unit 35 including a pair of side bars 36 and 37, each preferably made up of a pair of angles, as best shown in Figure 4, and the side bars 36 and 37 are held in spaced apart relation by suitable means (not shown). A pair of brackets 38 and 39 (Figure 2) are fixed, respectively, to the frame members 21 and 22 and pivotally support the rear ends of the side bars 36 and 37 through the medium of a cross shaft 41 to which the rear ends of the side bars 36 and 37 are connected by suitable bearing brackets. The shaft 41 therefore serves as the pivot axis about which the pick-up conveyor unit 35 pivots in a generally vertical direction between the side bars 21 and 22.

At the lower ends of the side bars 36 and 37 are mounted a pair of ground engaging shoes 46 and 47 constructed generally similar to rod weeder shoes, each shoe being secured, as by bolts 48, to the lower end of the associated side bar. Each shoe also includes a rotatable bushing 49 in which a rod 50 is disposed, the rod 50 being substantially square in cross section and is similar to the weeder rods. Guide plates 52 are secured to the front ends of the shoes 46 and 47 by any suitable means, such as bolts 53, and to the front ends of the upper angles of the side bars 36 and 37, as by bolts 54. An elevator or conveyor chain 57 is supported at its lower end on a pair of hardened conical rollers 58 (Figure 4) and at its upper end on drive sprockets (not shown) fixed to the shaft 41, the chain 57 being in the nature of an endless flexible element the lower end of which is spaced rearwardly from the rotating rod 50 a relatively small amount, as best shown in Figure 4.

The front end of the conveyor and pick-up unit 35 is raised and lowered relative to the frame 16 by means of a rockshaft 61 (Figure 4) supported in brackets 62 and 63 carried on the front cross bar 24. A pair of arms 65 and 66 are connected to the rockshaft, as by welding or the like, and the arms 65 and 66 act through a pair of links 69 and 71, connected at their lower ends to the side bars 36 and 37, to raise and lower the front end of the conveyor and pick-up unit 35. An actuating arm 73 is also fixed to the rockshaft 61 and is connected by a link 74 to a length of chain 75 that extends through a curved guiding member or ring 77 that is fixed to the upper end of the coupling pin 29. The chain 75 is trained around a sheave 81 carried on a bracket 82 on the tractor, and the upper end of the chain 75 is connected in any suitable manner to the power lift arm 12, as best shown in Figure 1. The power lift 10 may therefore be actuated to swing the arm 12 upwardly (Figure 1), and this will exert a pull through the chain 75 to rock the rockshaft 61 in a direction to raise the arms 65 and 66 and lift the front end of the conveyor and pick-up unit 35. The power lift unit 10 is preferably of the type in which the arm 12 may be held in a plurality of different lowered positions, whereby the depth of operation of the rod 50 may be varied as conditions may require.

The tractor 2 includes a power take-off shaft 85 (Figure 1) which is connected by a universal joint 86 with a telescoping shaft 87, the rear end of which is connected by a second universal joint 88 with a rearwardly extending drive shaft 89. The latter is journaled for rotation in a front bearing 91 carried by a bracket 92 (Figures 1 and 4) fixed to the front cross bar 24 of the main frame. The rear end of the drive shaft 89 is connected by a universal joint 94 to a stub shaft 95 (Figure 2), and the latter is connected by a set of bevel gears 96 to drive a cross shaft 97 that is supported by right and left hand brackets 98 and 99 secured at their lower ends to the side bars 36 and 37.

The jackshaft 97 carries a sprocket 102 that is driven by means of a slip clutch 103, and a driving chain 104 is trained around the sprocket 102 and around a larger sprocket 106 that is connected to the left end of the rear cross shaft 41. The latter shaft extends through a gear box 107 that encloses a set of bevel gears 108 by which a longitudinally extending jackshaft 109 is driven from the shaft 41. Front and rear brackets 111 support the longitudinal jackshaft 109. A sprocket 113 is fixed to the right end of the rear cross shaft 41 and a sprocket chain 114 is trained around the sprocket 113 and extends forwardly and is trained around a driving sprocket 116 (see Figure 4) which is fixed to a stub shaft 117 carried at the lower end of a U-shaped bracket 118 bolted, as at 119, to the right end of the cross bar 24. The left end of the stub shaft 17 is connected by a universal joint 123 to a telescoping shaft 124, and the latter is connected by another universal joint 125 to the right end of the rotary rod 50. Thus, the elevator or conveyor 57 and the rotary member 50 are driven at the same time and at the proper ratios by a connection with the power take-off shaft 85 of the tractor. Suitable tubes or shields 127, 128 and 129 enclose the various drive shafts to protect the operator and other persons from accidental contact therewith.

A wagon elevator unit, indicated in its entirety by the reference numeral 135, is carried at the rear of the implement frame 16 and includes an upwardly and laterally outwardly extending elevator frame 137 comprising parallel side bars 138 and 139 carrying brackets 141 at their lower ends whereby the frame 137 is supported for pivotal movement on the longitudinal shaft 109. Brackets 142 are fixed to the upper ends of the side bars 138 and 139 and receive a shaft 143 on which sprockets 144 (Figure 1) are carried. An endless conveyor or elevator chain 147 is supported at its upper end on the sprockets 144 and at its lower end on sprockets 148 (Figure 2) that are fixed to a shaft 149 supported on a pair of brackets 150 fixed to a pair of angles 151 that are connected at their lower ends to the frame bar 21. A sprocket 153 is fixed to the rear end of the shaft 149 and receives a driving chain 154 which extends laterally across the rear of the machine and is trained over a sprocket 155 (Figure 3) that is fixed to the rear end of the longitudinal jackshaft 109. The conveyor or elevator 135 is supported for vertical adjustment by a pair of screw-threaded rods 163 (Figure 3) which are connected by cranks 164 to the upper ends of a pair of vertical angles 165 that are fixed at their lower ends to the rear end of the frame bar 26. The angles 165 are reenforced by suitable bracing 167 and 168. The elevator side bars 138 and 139 carry bumpers which comprise a pair of rollers 171 journaled in brackets 172 that are fixed to the side bars. The rollers 171 are placed so as to be in a position to engage the sides of a wagon or truck in the event it is driven too close to the loader, thereby preventing any damage to the elevator chain 147 or other parts.

The elevator 135 carries front and rear sides 175 on the inclined frame bars 138 and 139, and a rear bangboard or plate 176 is fixed to the rear angle 151 and a laterally inner angle 177 which is bolted at its lower end, as at 178, to the rear frame bar 25. As best shown in Figure 3, the wagon elevator or chain 147 is not driven from the upper end, as is conventional practice, but is driven from its lower end by the sprockets 148. In operation, this results in the lower run or flight of the chain 147 being tight while the upper run is slack, and since the upper run or flight is slack, the portion immediately behind the elevator chain 57 hangs downwardly in a loop or catenary, indicated at 147a in Figure 3A, generally below the rearwardly moving upper run or flight of the chain 57, thereby forming a pocket or receptacle to receive the beets or other crop discharged rearwardly from the longitudinally moving chain 57. Since the chain 147 is driven from its lower end, this crop receiving pocket or loop is always present when the chain 147 is being driven. This would not be the case under certain conditions if the chain 147 were driven from its upper end since, in that case, any momentary increase in resistance to the rotation of the lower sprockets would result in tightening the upper flight or run and thereby throw the beets or other crop off the machine.

The operation of the loader of our present invention is substantially as follows.

The loader is hitched to the tractor 2 in the manner best shown in Figure 1 and the power lift 10 adjusted by the lever 13 to dispose the rotary rod 50 just at or below the surface of the ground, depending upon the condition of the ground. If hard, the rod 50 would move along the surface of the ground, but since the rod 50 is of relative small diameter it readily passes bodily under the beets. Thus as the machine is drawn forwardly along a pile or windrow of beets, for example, the rotation of the rod 50 acts to impart an upward and rearward movement to the beets so as to kick or impel them upwardly and rearwardly onto the lower end of the conveyor chain 57. Under most conditions, however, the ground condition will be such that the rod 50 can be operated just under the surface of the ground, as shown in Figure 5, so that the rod 50 will not come in direct contact with the lower beets; instead, the rod 50 passes along the top surface of the soil and the rotation of the rod, in the direction of the arrow in Figure 5, serves to pulverize the soil and draw it over the top of the rod between the latter and the beets. In this way, the rotating rod acts to form a cushion of soil, indicated by the reference numeral S in Figure 5, that lies between the rod 50 and the beets on the ground. This cushion of soil S is relatively thin and loose so that as the rod is rotated the corners thereof impart generally upwardly and rearwardly directed blows against the crop through the soil cushion S, and thus kick or propel them over where they are engaged and moved rearwardly by the elevator 36. Due to the presence of the intervening layer or cushion of soil S, and even though the member 50 constitutes a part that impels the lowermost beets upwardly and rearwardly, there is little likehood of bruising or other injury to the crop. Preferably, the lower end of the chain 57 is disposed rearwardly and substantially on the same level as the rod 50, in some instances the lower links moving forwardly through the soil loosened by the member 50 as the links pass first downwardly and forwardly and then upwardly and rearwardly around the lower rollers 58. Even though the pick-up member 50 operates under the surface of the ground, the draft of the machine is not excessive, due largely to the fact that the ground has already been loosened by the previous operation of lifting the beets, which occurs, of course, before they are harvested and piled or windrowed in the field. By the use of the rotary member operating just under the ground surface, with a protecting cushion of soil between the crop and the pick-up member, even a single beet lying on the ground will be kicked or impelled upwardly and rearwardly onto the chain 57 even though there are no other beets on top to provide the advantage of their added weight.

While we have shown and described above the preferred structure in which the principles of our invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A beet loader comprising a mobile support, a transverse rotary polygonal rod carried thereby and adapted to traverse the ground just under the ground surface, means for rotating said rod so that the upper part move generally rearwardly, and a conveyor to receive beets from said member and comprising an endless chain the links of which are disposed transversely and are spaced apart to provide open spaces therebetween, the lower forward end of said conveyor being disposed so that the links thereof are parallel to and rearwardly of said rod, and rotatable roller means over which the lower portion of said conveyor is received, the lower flight of said conveyor at the forward end thereof being disposed at approximately the same level as said polygonal rod and the diameter of said rod being substantially less than the diameter of said roller means.

2. A beet loader comprising a mobile support, a transverse rotary polygonal rod carried thereby and formed with a beet engaging portion that is non-circular in cross section, means mounting said rotary rod on said mobile support so as to dispose said rod normally with the upper part at the ground line and the lower part below the ground line, means for rotating said rod in a direction to carry soil and the like over the top thereof and rearwardly so that said rod serves to provide a cushion of soil between said rod and the beets to be loaded, and upwardly moving conveyor means having its lower end adjacent said rod and in a position to receive beets therefrom.

3. A loading machine comprising a mobile support, a rotatable rod of substantially polygonal cross section carried on said support in a position to pass under the ground surface, a conveyor comprising transverse spaced link-like elements generally parallel to said rod, rotatable means adjacent said rod and over which said conveyor is trained at its lower end, and supporting means for said rod and said rotatable conveyor-receiving means, said supporting means being arranged so that said rod lies forward of and has its lower portion below the level of the lower run of said conveyor.

4. A loader for root crops and the like piled on the ground, comprising a mobile support, a transverse rotary polygonal rod member carried by said support in a position to pass just underneath the ground surface, means for rotating said member as the same passes underneath a pile of beets or the like in a direction to carry the forward and upper parts of the rod upwardly and rearwardly whereby the rotation of the rod serves to break up any crust at the surface of the ground and to carry with the rod a cushioning layer of earth over the top of the rod, and a conveyor of the endless belt type disposed with its receiving end adjacent the rod and with its lower run behind said rod so as to run in the soil loosened by the rod and with its upper run above the cushioning layer of earth for receiving the crop from said rotatable member.

5. A loader for root crops and the like comprising a mobile support having a pair of laterally spaced shoes at its forward end formed to penetrate the soil a short distance, a rotatable rod polygonal in cross section carried by the forward end portions of said shoes in a position to pass just underneath the ground surface, crop conveying means carried by said support in a position to receive material from said rotatable rod, and means for driving said rod.

6. A loader for agricultural root crops and the like comprising an upwardly and rearwardly extending conveyor, a transverse rotary polygonal rod mounted for rotation forward of the conveyor and carried thereby in a position to pass along the ground just under the surface thereof, means for driving said conveyor from the upper end thereof, and driving means extending from the upper end of the conveyor down to said rod and including an inclined shaft and a universal joint connecting the lower end of said inclined shaft with said rod, the lower end of said shaft and said universal joint, with said rod, normally operating under the surface of the soil, said driving means acting through said shaft and universal joint for rotating said polygonal rod in a direction to cause the crop to be kicked rearwardly and upwardly onto said conveyor.

7. A loader for root crops and the like comprising a wheel supported frame, a conveyor comprising an endless elevator and frame means including a pair of generally downwardly and forwardly extending side bars pivoted at their rear upper ends to said frame, a rotatable ground engaging member carried at the front end of said side bars forward of the lower end of the elevator, means at the upper end of the elevator for driving the same, a connection from said driving means extending downwardly and forwardly to said rotatable member, a cross conveyor disposed on said frame at the rear of said conveyor so as to receive the crop from the latter and including frame means and an endless conveyor chain having a generally horizontal section and a generally upwardly inclined section, said cross conveyor frame means being supported on said frame so that the upper run of said horizontal section is disposed rearwardly of the upper pivoted end of said first conveyor and the upper run of the upwardly inclined section extends upwardly and laterally away from said conveyor, the upper run of said horizontal section being unsupported for a transverse distance at least substantially equal to the width of said conveyor, and means for driving said cross conveyor only from the end of said lower horizontal section opposite the upwardly inclined section, whereby the lower run of said cross conveyor chain is taut while the upper run is slack and the portion thereof forming the upper run of said horizontal section hangs in a generally downwardly extending loop so as to serve as a receiver for the crop delivered rearwardly by said first conveyor.

8. Apparatus for loading beets and other crop from a pile or windrow on the ground into a vehicle or other receptacle, comprising a support, a transverse rotary polygonal rod carried by said support in a position to traverse the ground just underneath the ground surface, means to rotate said rod in a direction to form a soil cushion between the rod and the pile or windrow, the soil cushion being lifted over the rod by the soil displaced by the rod, and an elevator arranged in downwardly and forwardly disposed position to engage the crop as it is lifted by said soil cushion over the rod and to convey the crop into the vehicle or receptacle.

9. A crop loader comprising frame means, a pair of soil engaging shoes mounted in laterally spaced apart fore and aft extending relation and including soil penetrating portions, a transverse polygonal rod supported for rotation in the soil penetrating portions of said shoes, elevator chain supporting means carried by said frame means immediately rearwardly of said rod, and an elevator chain carried by said supporting means.

10. A crop loader comprising frame means, a pair of soil engaging shoes mounted in laterally spaced apart fore and aft extending relation and including soil penetrating portions, a transverse polygonal rod supported for rotation in the soil penetrating portions of said shoes, elevator chain supporting rollers, one mounted at each side immediately rearwardly of said rod, and an elevator chain carried by said supporting means, the diameter of said rollers being appreciably larger than said rod and said rollers being mounted relative to said rod so that the lower run only of said elevator chain moves through the soil loosened by said rod.

11. A beet loader adapted to be attached to a farm tractor having a drawbar and a pair of rear drive wheels, one of which is disposed farther away from the center of the tractor than the other, said loader comprising a wheel supported frame having wheels spaced apart laterally the same distance as said tractor drive wheels so as to run in the same tracks as the tractor drive wheels, said frame including three generally longitudinally extending frame members disposed in laterally spaced relation, the central and one of the other frame members converging forwardly to form a hitch section adapted to be connected to said tractor drawbar, said hitch section being disposed in such lateral position that, when hitched to the tractor drawbar, the supporting wheels of the loader are disposed in line rearwardly of the tractor drive wheels, and beet engaging and elevating means carried between said central frame member and the third frame member so as to be disposed in a position substantially midway between said tractor drawbar and said laterally disposed tractor drive wheel.

12. A beet loader adapted to be attached to a farm tractor having a drawbar and a pair of rear drive wheels, said loader comprising a wheel supported frame having wheels spaced apart laterally the same distance as said tractor drive wheels so as to run in the same tracks as the tractor drive wheels, said frame including three generally longitudinally extending frame members disposed in laterally spaced relation, the central and one of the other frame members converging forwardly to form a hitch section adapted to be connected to said tractor drawbar, said hitch section being disposed in such lateral position that, when hitched to the tractor drawbar, the supporting wheels of the loader are disposed in line rearwardly of the tractor drive wheels, and beet engaging and elevating means carried between said central frame member and the third frame member so as to be disposed in a position substantially midway between said tractor drawbar and the tractor drive wheel at that side of the tractor.

13. In a beet loader or the like, a wheel supported frame including means forming a forward hitch section, a pair of laterally spaced apart ground wheels supporting the rear portion of said frame, said hitch section being spaced laterally of one of said ground wheels, a downwardly and forwardly extending elevator carried by said frame between said one ground wheel at one side of the loader frame and said hitch section and including ground engaging means at the front end of said elevator, and a second elevator carried at the rear of said loader frame to receive material from said first elevator and extending laterally outwardly at the other side of the loader frame beyond the ground wheel at that side, whereby to counterbalance, at least partially, the side draft due to the disposition of said ground engaging means and associated parts at one side of said hitch section.

14. A beet loader comprising a mobile support, a transverse rotary rod carried thereby and adapted to traverse the ground just under the ground surface, means for rotating said rod so that the upper part moves generally rearwardly, and a conveyor to receive beets from said member and comprising an endless chain the links of which are disposed transversely and spaced apart to provide open spaces therebetween, the lower end of said conveyor being disposed so that the links thereof are parallel to and rearwardly of said rod, and rotatable means over which the lower portion of said conveyor is received, the lower flight of said conveyor at the forward end thereof being disposed at approximately the same level as said rod and the external diameters of said rotary rod and said transverse chain links being relatively small, as compared with said rotatable means, so as to facilitate passage of the same through the soil at the ground surface.

15. A loader for beets and other crops adapted to be stored in piles, windrows or the like on the ground, said loader comprising a downwardly and forwardly disposed frame, a rod member mounted for rotation in the lower and forward portion of said frame so as to dispose the rod in a forward position to meet the unbroken ground surface as the loader travels forwardly, means for supporting the frame so as to dispose said rod member in a position at least partially below the surface of the ground to facilitate passage of the rod member underneath said beets or other crop, means for propelling said frame, and means for rotating said rod member.

16. Apparatus for loading beets and other crops from a pile or windrow on the ground into a vehicle or other receiver therefor, comprising a mobile support, a movable driven crop impelling member, means for movably carrying said member on said support in a position to pass at least partially under the surface of the ground on which the beets or other crop lie, said member being shaped so that when it is driven it serves to deliver a series of generally upwardly directed and successively advancing blows against the crop on the underside thereof through the cushion of soil therebetween so as to elevate the crop, means for driving said member, and conveyor means positioned adjacent said member so as to receive the crop after it has been elevated by said blows imparted thereto by said driven member through said cushion of soil and move the crop to said crop receiver.

17. Apparatus for loading beets and other crops from a pile or windrow on the ground into a vehicle or other receiver therefor, comprising a mobile support, a rotary crop impelling member, means for rotatably carrying said member on said support in a position to pass at least partially under the surface of the ground on which the beets or other crop lie, said member having portions disposed eccentrically with respect to the axis of rotation of said member so that when the latter is rotated it serves to deliver a series of generally upwardly directed and successively advancing blows against the crop on the underside thereof through the cushion of soil therebetween so as to elevate the crop, means for driving said member, and conveyor means positioned adjacent said member so as to receive the crop after it has been elevated by said blows imparted thereto by said rotary member through said cushion of soil and move the crop to said crop receiver.

CLAUDE W. WALZ.
ROBERT D. GRIFF.
CLARENCE T. RASMUSSEN.

REFERENCES CITED

The following references are of record in the file of this patent:

UNITED STATES PATENTS

| Number | Name | Date |
| --- | --- | --- |
| 1,104,986 | Goodnough | July 28, 1914 |
| 2,267,879 | Tillitt | Dec. 30, 1941 |
| 777,235 | Abraham | Dec. 13, 1904 |
| 1,774,047 | Wharton | Aug. 26, 1930 |
| 1,834,658 | Symonds | Dec. 1, 1931 |
| 1,466,889 | Mortensen | Sept. 4, 1923 |
| 1,239,337 | Ball | Sept. 4, 1917 |
| 2,257,351 | Silver | Sept. 30, 1941 |

FOREIGN PATENTS

| Number | Country | Date |
| --- | --- | --- |
| 381,578 | France | Nov. 14, 1907 |